May 4, 1926.

G. H. SAUTON 1,583,607

ELECTRIC METER PROTECTING MEANS

Filed August 18, 1922  2 Sheets-Sheet 1

Inventor
George H. Sauton
By
Attorney

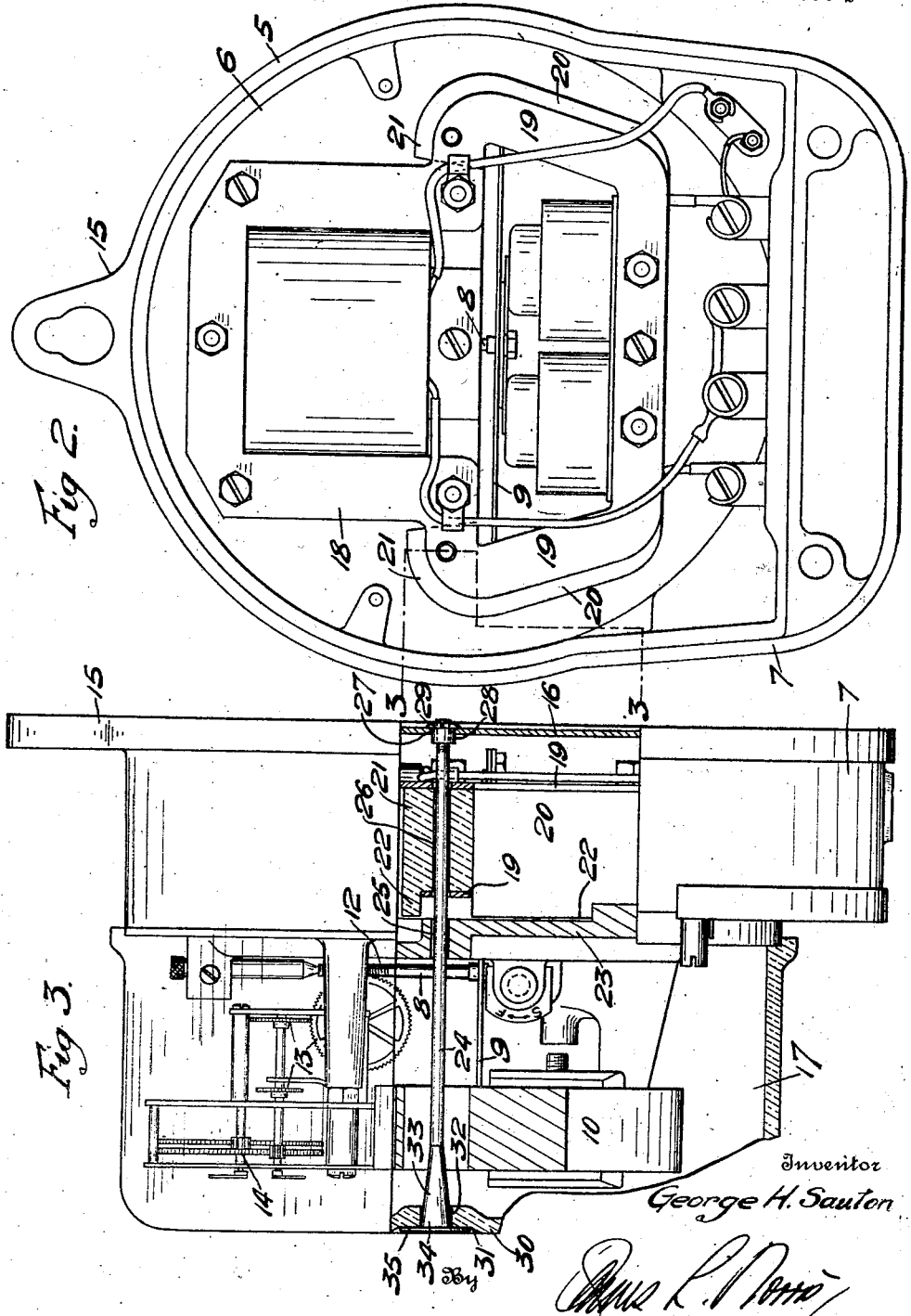

Patented May 4, 1926.

UNITED STATES PATENT OFFICE.

1,583,607

GEORGE H. SAUTON, OF NEW ORLEANS, LOUISIANA, ASSIGNOR OF ONE-SIXTEENTH TO EDWARD H. WALSDORF AND ONE-SIXTEENTH TO LOUIS HUFFT, BOTH OF NEW ORLEANS, LOUISIANA.

ELECTRIC-METER-PROTECTING MEANS.

Application filed August 18, 1922. Serial No. 582,670.

*To all whom it may concern:*

Be it known that I, GEORGE H. SAUTON, a citizen of the United States, residing at New Orleans, in the parish of Orleans and State of Louisiana, have invented certain new and useful Improvements in Electric-Meter-Protecting Means, of which the following is a specification.

This invention relates to electric meter protecting means for use with all classes of electric and analogous meters to which it may be applicable, but particularly adapted for meters of that type comprising a rotary mechanically controlled damping disk or analogous movable component operatively associated with registering mechanism.

Considerable financial loss ensues to railroad and other companies or corporations engaged in the generation and service of electric current for municipalities, communities in general, manufacturing plants and the like, using electricity for lighting, heating, motor and other purposes, due to unauthorized and nefarious manual modification and tampering with the mechanism of electric meters introduced between a service main and individual current service installations to effect falsification of the meter registration and to correspondingly reduce the cost of the current used relatively to the amount of current that has been actually used and which would be correctly registered by such altered meter if permitted to normally operate.

Numerous methods have been adopted to check the operations of the rotary damping disk or other corresponding movable part of an electric meter to slow up the operation of the said disk or part and modify the showing of the registering mechanism without impairing the current supplied through the meter, and among some of the most common practices are, to drill small openings through various parts of the casing at positions concealed from ordinary observation and insert a small wire and cause the latter to bear against the rotary disk or movable part with sufficient frictional pressure to brake said disk or part, or, to similarly insert a piece of cord or thread into the meter, and also to insert wire or a similar device into the joint parts of the meter casing or through bolt or fastening openings beside the bolts or fastenings therein for securing the parts of the meter, to effect a check of the normal registration of the meter. Another practice has been to remove a meter from its support, disconnect the back closure to give access to the interior mechanism and insert various devices between the damping disk and an adjacent fixed part actuating the registering mechanism, or, to reverse the operation of the mechanism and reduce the record showing the amount of current used.

The main objects of the present invention are, to equip an electric meter with structural features that will protect or shield the working parts thereof and prevent boring openings completely through to the working parts; occlude the openings for the fastening devices or bolts around the latter by completely filling the same, and prevent separation of the back of the meter casing by the practice of ordinary mechanical methods, and to so apply the said structural features as to avoid the least modification or interference with the standardized meter construction, and thereby effect and conserve an accurate registration of the amount of current used with the possibility of making a correct monetary charge in accordance with agreements as to service rendered.

With these and other objects and advantages in view, the invention consists in the construction and arrangement of the several parts which will be more fully hereinafter described and claimed.

In the drawings:

Fig. 2 is a rear elevation of the meter showing the back plate removed and illustrating particularly the opposite side guards or protectors for the damping disk or main actuating part of the meter;

Fig. 3 is a side elevation of the meter, showing a portion thereof in section on the line 3—3, Fig. 2, the front glass enclosing globe being broken away and shown in section completely to its lower limit;

Figure 1:
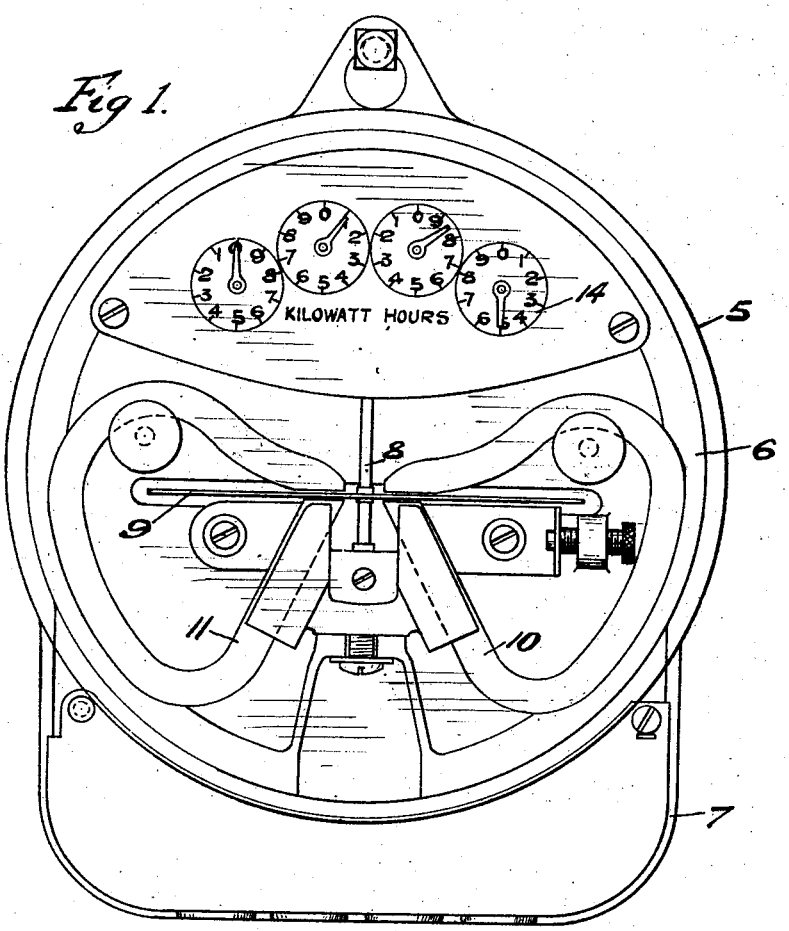
Fig. 1 is a front elevation of an electric meter having the improved protecting means applied thereto.
Figure 4:
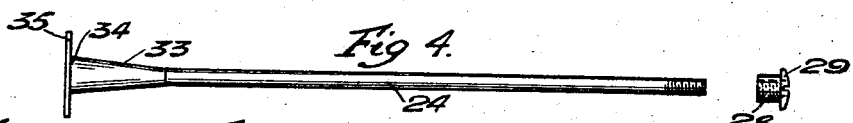
Fig. 4 is a detail side elevation of one of the improved securing screw rods and nut therefor.
Figures 5, 6:
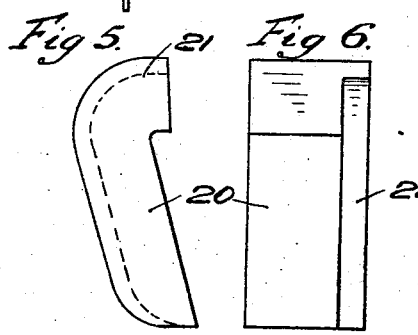
Figs. 5 and 6 are detail views, respectively, in side elevation and outer face elevation of one of the guards or protectors.

As hereinbefore indicated, the improved protecting means is intended to shield and prevent tampering with the main actuating element, such as a damping disk or analogous movable part magnetically influenced and actuating the registering mechanism in a well known manner. In the accompanying drawings one form of an electric meter is shown, but the invention in view of its intended general application is not limited to any precise form of construction and organization of meter, and in describing the improved features applied to the particular form of meter shown as will be hereinafter set forth, it should be understood that one development only is adopted for the purposes of demonstrating a convenient and effectively acting arrangement of the improved protecting means.

Referring to the form of meter shown for the purposes of illustration and demonstration, the numeral 5 designates a casing having a substantially circular body 6 with a depending member 7, to accommodate the several components and electric connecting devices adopted in this type of meter. A shaft 8 mounted for free rotation is disposed in the center of the casing and has a damping disk 9 secured thereto and freely movable between and within permanent magnets 10 and 11, which are provided with suitable windings and disposed and operate as well understood in the art. The shaft 8 has screw or worm threads 12 formed on a portion thereof, as shown by Fig. 3, to cooperate with a train of gearing 13 for actuation of registering mechanism 14. The operation of this meter will be readily understood, but briefly explained, the damping disk 9 is rotated through magnetic influence by the current passing through the meter or traversing the course of the electrical connections as in usual devices of this type, the rotation of the disk 9 in turn actuating the registering mechanism through the shaft 8 and train of gearing 13 to show the amount of current used in accordance with the scale of measurement adopted and which is usually in kilowatt hours. The casing has a rear flange 15 which assists in the application and securement of the same against a suitable support and is also closed at the rear by a back plate 16 which is snugly fitted therein and is normally located adjacent to the support for the meter. Over the front of the meter of the type shown a glass globe or casing 17 is fitted, and in some structures it will be understood that this globe instead of being made of glass as an entirety is constructed of metal and provided with a sight glass over the dials of the registering mechanism. The electro-magnet organization has associated therewith frame plates 18 with lower downwardly converging side members 19 between which the damping disk 9 is mounted to rotate. These frames 18 are duplicated at the front and rear and held rigid within the substantially circular body 6 of the casing 5. The front glass globe or casing 17 is usually secured by screw rods extending therethrough and between the parts of the meter at the front and through the lower converging members 19 of the frames 18, the rear ends of these screw rods projecting through the back plate 16 and having nuts ordinarily applied thereto and easily removable. Moreover, in the usual construction of this type of meter the lower downwardly converging members 19 of the frames 18 have clear spaces between them and therethrough the damping disk 9 is exposed at opposite portions of the casing. The structural features of the electric meter as thus far described form no part of the invention and are well known in the electrical art, and in applying the improved protecting means as will be presently explained there is no modification of the general organization of the meter construction necessary, it being possible to apply the improved protective devices embodying the features of the invention not only to the particular form of meter shown in the drawings but to other meters, as hereinbefore specified.

One of the principal features of the improved protecting means consists of side guards or protectors 20 inserted between the lower converging members 19 of the frames 18 and formed of glass or any hard material that will resist penetration by a drill or other boring means. There is one of these protectors located at each side of the meter mechanism between the frame members as above set forth, and it is preferred that the upper extremities of the guards or protectors 20 be curved and projected high enough, as at 21, to shield the damping disk 9 over opposite portions of the periphery thereof to obstruct any downward diagonal or angular insertion of devices that may be intended to engage the said damping disk. Furthermore, each guard or protector 20 stands out beyond the outer edges of the members 19 of the frames 18 and has an angular flange 22 following the contour thereof and adapted to project close to the front wall 23 of the casing, as shown by Fig. 3, so as to shield the disk 9 from engagement through the space that might otherwise remain unprotected or unguarded between the lower members 19 of the front frame plate 18 and the adjacent front wall 23 of the casing which encloses a part of the magnet organization. It is proposed, also, to have the impenetrable guards or protectors 20 closely follow the contour of the adjacent casing wall 23 fully to the bottom of the substantially circular body 6, or, in other words, to fill up all the space possible at opposite portions of the casing between the periphery of the disk and the surrounding casing wall to such an extent as to render it impossible to introduce wires or other implements into the side wall of the casing as well as the front wall for the purpose of reaching and checking the operation of the damping disk 9. The guards or protectors 20 are held in fixed positions between the members 19 of the frames 18 against displacement by the fastening devices connecting the said frames and also by the fastening means or screw rods for the front dome enclosure or casing 17, which in the present instance is shown as being formed of glass to clearly expose the operating mechanism at the front of the meter.

The securing means or screw rods for the glass dome or enclosure 17 also embody features of the improvement. As hereinbefore specified, the fastening means for the glass dome or front enclosing casing 17 are in the form of elongated screw rods or clamping devices 24 which are inserted through openings 25 and 26 in the front casing wall 23 of the main body of the casing and the upper portions of the guards or protectors 20. The rear screw-threaded ends of the screw or clamping rods 24 project through openings 27 in the back plate 16, and thereover are applied cap nuts 28 which have outer heads 29 bearing against the rear side of the said back plate. The front side 30 of the glass dome 17 is flat and formed with depressions 31 which are centrally bored as at 32. The features of the screw or clamping rods 24 contributing to the protection of the meter consist first in providing the shank of each rod adjacent to its outer end with an elongated tapered enlargement 33 having its maximum diameter 34 snugly fitting in the outer portion of the opening 32 and completely filling the latter, to obstruct introduction through the opening beside the tapering or conical enlargement of a wire or other analogous implement for the purpose of reaching and obstructing the free operation of the damping disk 9. On the outer end of each screw or clamping rod 24 is a flat head 35 of rather large diameter as compared to the heads of these rods as ordinarily formed and taking up very nearly all of the area of the depression or seat 31 and completely covering the opening 32, or the joint between the wall of this opening and the conical or tapering enlargement 33. By this means it will be seen that it will be impossible to introduce any sort of device through the opening 32 and, therefore, the damping disk 9 will be shielded and protected at a point which under the ordinary construction may be utilized for tampering with the damping disk. The next feature of improvement embodied by each of the clamping or screw rods 24 is that instead of leaving the cap nut 28 engaging the back plate 16 free for removal, the rear end of the screw or clamping rod which projects slightly beyond the cap 29 is swaged or upset over the cap nut, to prevent removal of the latter, and this positive securement of the rear end of the screw or clamping rod 24 will insure a tight engagement of the front flanged and conically enlarged end of the said rod with the front wall or side 30 of the glass dome or casing 17 and the opening 32 through which the screw or clamping rod is inserted. It will also be seen that each screw or clamping rod 24 serves to effectively secure the guard or portector 20 through which it passes in applied position, and as a further protective feature, to prevent any possibility of severing either clamping rod where it passes through the rear portion of the casing and the guard, the penetration of the glass or other impenetrable guard or protector by a cutting means will be obstructed and prevent such separation. It will therefore be seen that each guard 20 and screw or clamping rod 24 has dual functions, each guard not only shielding and preventing tempering engagement with the disk 9 and also shielding the rear portion of the rod passing therethrough, and each rod not only serving as a securing means for holding the front dome or enclosure 17 and the rear or back plate 11 in firmly applied position, but at the same time obstruct any effort that that may be made to insert a wire or other implement within the interior of the dome or casing 17 to reach the damping disk 9. Furthermore, by securing the ends of the rods 24 in connection with the back plate 16 in such manner as to prevent removal of the cap nut 28, said back plate will be held firmly intact with the rear of the casing and removal thereof and tampering with the damping disk from the rear portion of the meter prevented.

From the foregoing it will be seen that the parts of the improvement are all easily applied without in the least changing or reorganizing any of the structural features of the meter, and the use of the improved protective means involves very little expense, particularly in view of the great saving to a corporation or company controlling the meter due to obstruction at any point of the insertion of means to check or interfere with the operation of the damping disk 9, or to directly manipulate this disk and thereby permit the meter to operate accurately and register the amount of current or the kilowatt hours with certainty relatively to the actual amount of current used and traversing the meter.

The broad combination of the casing of an electric meter and protecting means within said casing for shielding the magnetically controlled movable part which actuates the registering mechanism and preventing tampering with the same from the exterior of the casing, forms the subject-matter of my separate application, Serial No. 730,034, filed August 4, 1924.

What is claimed as new is:

1. The combination with an electric meter having a casing with front and rear closure devices and openings therein, a movable magnetically controlled member within the casing and registering mechanism actuated by said member, of elongated securing means extending through the openings of the closure devices and the interior of the casing and provided with relatively elongated tapered extremities at their front portions to deflect the insertion of a rod, wire or the like through the said openings and prevent engagement with the movable member, said securing means also having outer diametrically enlarged disk-like heads for snugly fitting the openings in the front closure device and serving as auxiliary means for reaching the openings from the exterior and preventing straight insertion of wires and the like through the said openings, the opposite ends of the rods having means immovably secured thereto and requiring cutting and destruction thereof to separate the rods from the closure devices.

2. The combination with an electric meter having a casing with front and rear closure devices provided with openings therethrough, a movable magnetically controlled member within the casing and registering mechanism actuated by said member, of securing rods extending transversely through the openings of the casing of the front and rear closure devices and formed at their front extremities with elongated tapered enlargements to completely fill the openings through which they pass to prevent straight insertion of wires and like devices through the openings to reach the said movable member and also thereby obstruct engagement with the registering mechanism from the exterior of the casing, the rear ends of the rods having permanent securing means to prevent displacement of the closure devices and requiring cutting off said means to open up the casing.

3. The combination with an electric meter of a casing, with front and rear closure devices formed with openings therethrough on opposite sides of the center thereof, the openings in the face of the front closure device having exterior depressions therearound, a movable magnetically controlled member within the casing and registering mechanism actuated by said member, of connecting rods extending transversely through the casing and the openings of said closure devices and having their front extremities formed with elongated enlargements diverging towards outer flanged heads integrally formed therewith to completely fill the depressions and openings through which the enlargements pass and also cover the openings through the medium of the flanged heads at such distances from the tapered enlargements as to prevent the insertion of wires and the like through the openings into the interior of the casing for the purpose of engaging the registering mechanism from the exterior of the casing.

4. The combination with an electric meter having a casing with front and rear closure devices having openings therein, a magnetically controlled movable member within the casing and registering mechanism actuated by the said member, of protecting means within the casing adjacent to opposite portions of the said member to prevent reaching the latter from the exterior of the casing, and connecting rods extending transversely through the casing and the front and rear closure devices and also through the protecting means and completely filling and covering the openings through the front closure device and permanently secured against the rear closure device.

In testimony whereof I affix my signature.

GEORGE H. SAUTON.